Figure 1:
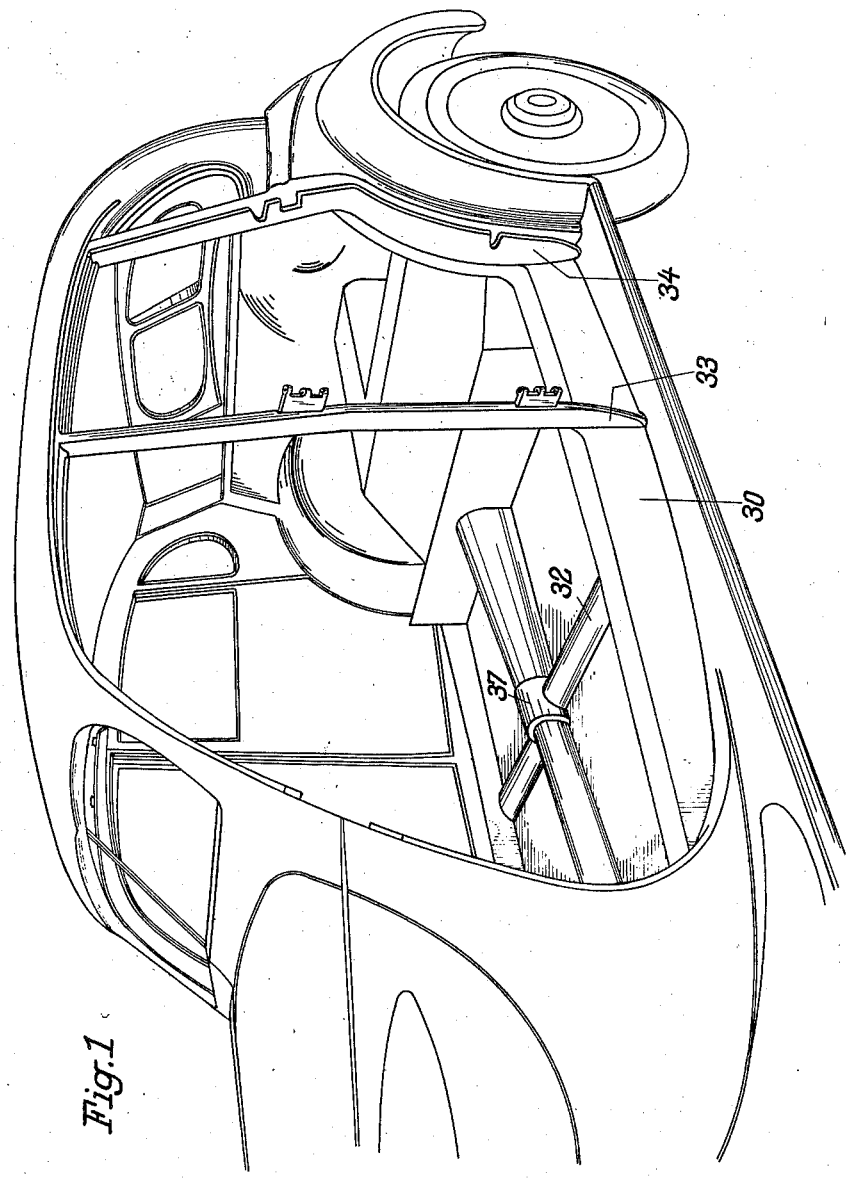

Aug. 8, 1939. F. BRUSS 2,168,436
CHASSIS FRAME FOR VEHICLES
Filed July 30, 1937 4 Sheets-Sheet 1

INVENTOR
Franz Bruss

BY John P. Tarbox
ATTORNEY

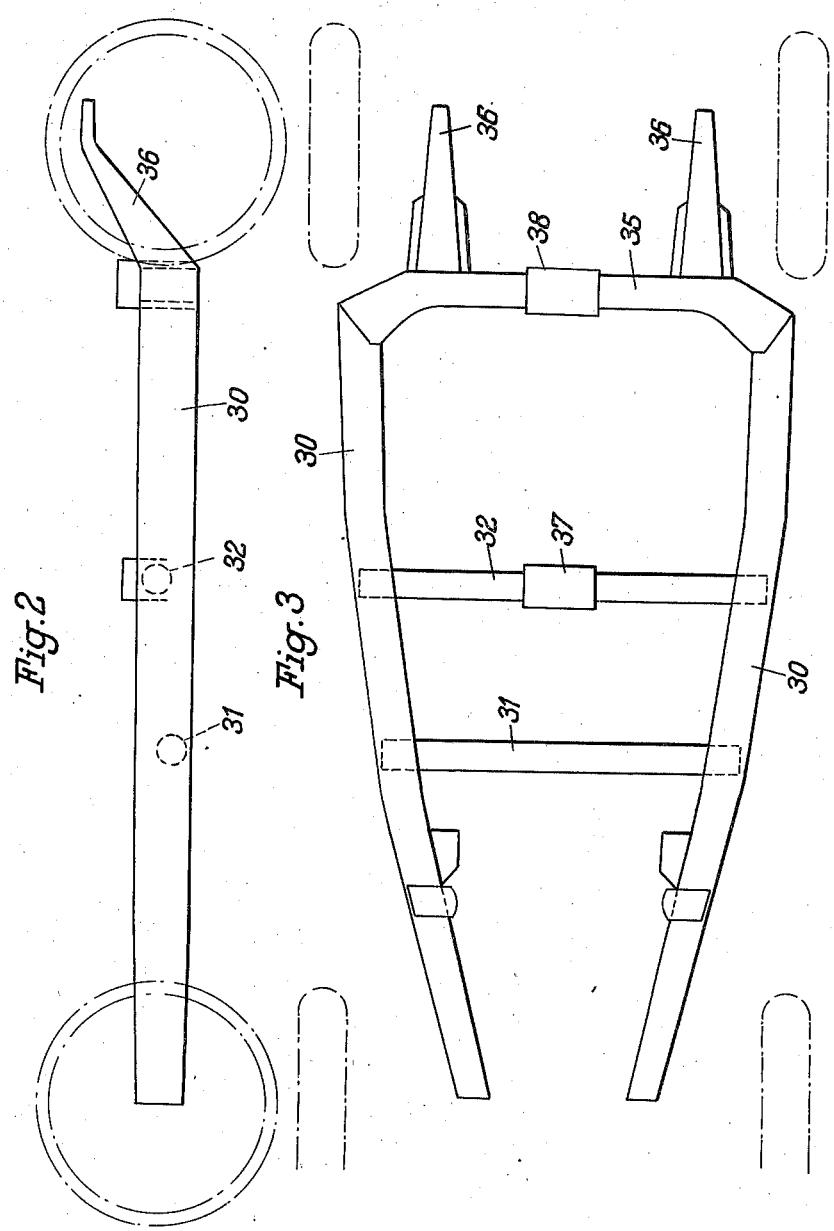

Aug. 8, 1939.  F. BRUSS  2,168,436
CHASSIS FRAME FOR VEHICLES
Filed July 30, 1937  4 Sheets-Sheet 3
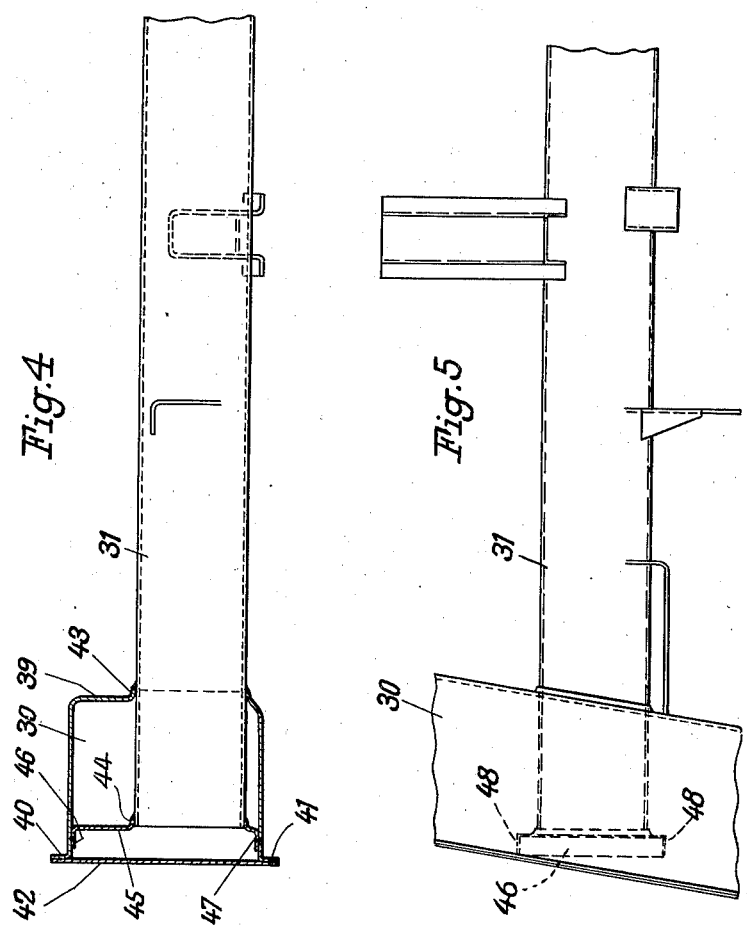
INVENTOR
Franz Bruss
BY John P. Tarbox
ATTORNEY Aug. 8, 1939.  F. BRUSS  2,168,436
CHASSIS FRAME FOR VEHICLES
Filed July 30, 1937  4 Sheets-Sheet 4
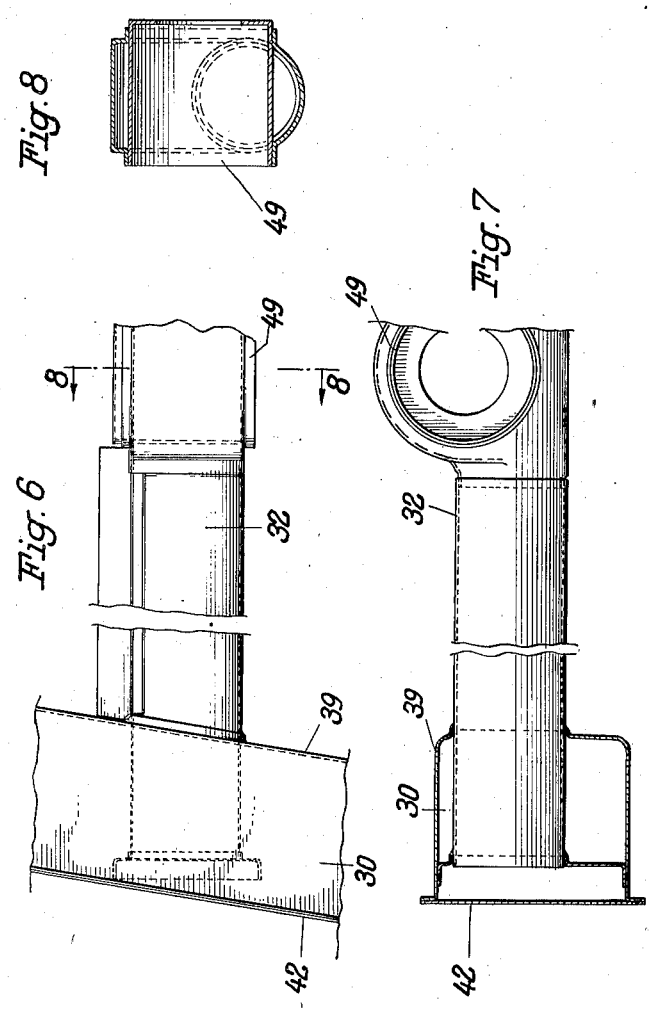
INVENTOR
Franz Bruss
BY John P. Tastor
ATTORNEY Patented Aug. 8, 1939

2,168,436

UNITED STATES PATENT OFFICE 2,168,436

CHASSIS FRAME FOR VEHICLES

Franz Bruss, Lichtenberg, near Berlin, Germany, assignor to the firm Edward G. Budd Manufacturing Company, Philadelphia, Pa.

Application July 30, 1937, Serial No. 156,508
In Germany August 15, 1936

5 Claims. (Cl. 280—106)

The invention relates to a vehicle frame comprising longitudinal sills and transverse sills both being preferably box sectional sills. The frame may be adapted to simultaneously form the chassis frame and the body underframe to which the posts and the panelings of the body are directly secured, e. g., by welding.

A important feature of the invention consists in the connection between a transverse sill member having preferably circular cross section and a box-sectional longitudinal sill of the frame. According to the invention said sill member extends through and is fastened in an opening which is provided in one wall of the longitudinal sill, and its end is connected to a bracket arranged within and connected to the sill. Preferably the transverse sill member is with its free end supported in an opening likewise tightly enclosing it provided in said bracket. The openings in the wall of the longitudinal sill and in the bracket are preferably provided with marginal flanges directed towards middle of the car and closely fitting the transverse sill member. The bracket which extends preferably at right angles to the axis of the transverse sill member may be supported by and secured to the upper and lower wall of the longitudinal sill, e. g. by spot welding, through flanges which are preferably outwardly bent off from its upper and lower margins. In order to attain greater stiffness also the lateral margins of the bracket may be provided with flanges, vertically extending indentations or the like. The fastening of the transverse sill member to the openings in the inner wall of the longitudinal sill and in the bracket may be effected by spot or arc welding. Sometimes it will be advisable to effect at first a provisional securement by spot welding and to effect the final securement by arc welding.

Further features and advantages of the invention may become apparent from the following description of a vehicle chassis or body frame formed in accordance with the invention when read in connection with the accompanying drawings illustrating the same.

In the drawings,

Fig. 1 is a perspective view showing a body and chassis frame formed according to the invention as seen from the front and side, Figs. 2 and 3 show a body formed in accordance to the invention in side elevation or in plan view respectively, Figs. 4 and 5 show a longitudinal section through a frontal chassis frame transverse sill member or a plan view respectively illustrating the connection between said transverse sill member and a longitudinal sill, Figs. 6 and 7 show a longitudinal section through an intermediate transverse bearer sill member or a plan view respectively, illustrating the connection of said sill member with a longitudinal sill, Fig. 8 is a section taken along the line 8—8 of Fig. 6.

In the drawings 30 are the lateral chassis frame sills, 31 is an intermediate transverse sill member arranged near the toe board, 32 is an intermediate transverse sill member extending below the front seats, 33 is the intermediate, so-called B—C, post of the two-doored, closed car shown in Fig. 1 and 34 is the rear or D-post.

In the embodiments of a frame according to the invention shown in Figs. 2 and 3 the longitudinal side sills 30 converge at their front ends and are connected at their rear ends lying in front of the rear wheels or the rear axle respectively by a transverse sill member 35. Two brackets 36 are rearwardly and upwardly projecting from said rear transverse member 35 and extending over the rear axle. To these brackets 36 there may be secured the springing for the rear wheels as well as a trunk casing. The longitudinal side sills are connected to each other, besides by the above named transverse members 31, 32 and 35, also by a frontal transverse sill member (not shown) preferably detachably fastened by means of screws. The chassis frame shown by way of example is preferably adapted for motor vehicles with the rear wheels supported by swinging half axles, whereby the Cardan shaft would be supported in the sections 37 or 38 respectively, of the subdivided transverse sill members 32 or 35 respectively.

Figs. 4 and 5 illustrate the connection between the frontal transverse member 31 arranged near the toe board with the one longitudinal side sill 30. The transverse member 31 has circular cross section whereas the longitudinal sill 30 has box-shaped in cross section and consists of an outwardly facing channel member 39 having marginal flanges 40 and 41 projecting upwardly and downwardly from its free margins and of a covering plate 42 secured to these flanges. The middle axis of the transverse member 31 is preferably arranged below the middle axis of the longitudinal sill 30 so that the Cardan shaft may be freely passed over it. The transverse member passes through an opening tightly enclosing it in the inner wall of the longitudinal sill and having a flange 43 directed towards the center line of the car, it extends near to the outer wall of the longitudinal sill and it is supported with its free end in an opening likewise tightly enclosing it of a bracket 45. This bracket is provided along the margin of the opening with a flange 44 directed towards the center line of the car. The bracket 45 is supported by and secured to the upper and lower wall of the longitudinal sill, e. g., by spot welding, by means of flanges 46, 47 outwardly bent off from its upper and lower margins. For the purpose of increasing its strength, the bracket 45 is furthermore provided with flanges 48 bent off from its lateral margins.

Figs. 6, 7 and 8 show the connection of the intermediate transverse sill member 32 extending below the front seats with one of the lateral longitudinal sills 30 and with a central casing 49 serving for bearing or accommodating the Cardan shaft. The transverse member 32 of circular cross section has its middle axis arranged above the middle axis of the longitudinal sill 30; besides the connection between the transverse member and the longitudinal sill is similar in all respects to the connection of the transverse member 31 with the longitudinal sill 30. The axis of the passage opening of the central part 49 subdividing the transverse bearer 32 is arranged above the axis of the transverse bearer.

The invention is not limited to the embodiment shown and described. There may be details otherwise formed without deviating from the spirit of the invention.

I claim—

1. In a vehicle frame comprising a box sectional sill and a second sill member arranged at an angle and connected to said first named sill, said second sill member extending through and being fastened in an opening of one wall of said first sill, a bracket arranged within and connected to said first sill, said bracket forming a support for that part of said second sill member extending into the interior of said first sill.

2. In a vehicle frame according to claim 1, said bracket being spaced from said wall of the first named sill through which said second sill member extends.

3. In a vehicle frame according to claim 1, said bracket being spaced from the wall through which said second sill member extends and from the wall opposite to said first named wall.

4. In a vehicle frame according to claim 1, said bracket being provided with an opening into which said second sill member enters and in which the end of said second sill member is fastened.

5. In a vehicle frame according to claim 1, said bracket being supported by and fastened to the walls of said first named sill adjoining the wall through which said second sill member extends.

FRANZ BRUSS.